United States Patent Office 2,992,261
Patented July 11, 1961

2,992,261
STABLE LEAD ALKYL COMPOSITIONS AND A METHOD FOR PREPARING THE SAME
Hymin Shapiro, Baton Rouge, La., and Herbert R. Neal, Farmington, Mich., assignors to Ethyl Corporation, New York, N.Y., a corporation of Delaware
No Drawing. Filed Dec. 8, 1959, Ser. No. 858,056
4 Claims. (Cl. 260—437)

This invention relates to alkyllead compositions which are stable at temperatures above 100° C. It also relates to methods for inhibiting the thermal decomposition of alkyllead compounds when subjected to temperatures above 100° C. at which temperature thermal decomposition becomes appreciable.

Generally this invention contemplates inhibiting the thermal decomposition of alkyllead compounds in which at least one valence of the lead is satisfied by an alkyl radical.

More specifically, this invention is concerned with an improved process for separating alkyllead compounds from the reaction products accompanying their synthesis. It is also applicable to a method for inhibiting thermal decomposition of an alkyllead product during its purification and blending with other products in makng commercial antiknock fluids. It is applicable to minimizing the possibility of thermal decomposition during storage or transportation of an alkyllead product. It is especially applicable to preventing thermal decomposition of undiluted alkyllead compounds where the likelihood of thermal decomposition is more of a problem.

As is well known, tetraalkyllead antiknock compounds generally are produced by reacting a sodium-lead alloy with an alkyl halide. Due to recent marked improvements in the technology of alkyllead manufacture, thermal instability of alkyllead compounds during synthesis is no longer a problem. However, the tetraalkyllead compound so produced is in admixture with various reaction by-products from which it must be separated. Separation is effected by steam or vacuum distillation with subsequent purification of the tetraalkyllead distillate. Due to the toxic and unstable nature of tetraalkyllead antiknock compounds, these distillation and purification operations are subject to many difficulties.

In these distillation and purification operations meticulous temperature control and exact safety measures are of paramount importance. The rate of decomposition of the alkyllead compound increases rapidly with small rises in temperature above the temperature where thermal decomposition becomes appreciable. For example, decomposition of tetraethyllead occurs at the rate of approximately 2 percent per hour at a temperature of 100° C., which is the customary temperature used in separating tetraethyllead from the reaction products accompanying its synthesis. At temperatures above 100° C. the decomposition rate increases logarithmically so that a point is soon reached where external heat is no longer required and decomposition becomes self-propagating.

Such likelihood of excessive decomposition is present also during blending, handling, storage, and transportation. Prior to diluting the alkyllead concentrate with scavengers, gasoline or other materials, the alkyllead compound remains a concentrate and the problem of excessive thermal decomposition exists, even though the temperature is maintained normally well below that of decomposition. For example, in the purification step wherein the tetraethyllead concentrate is washed and blown with air at atmospheric temperature to remove impurities, a sudden increase in temperature may occur due to the oxidation of triethylbismuth which is present at an impurity. Also pumps used in handling tetraethyllead occasionally "freeze" and the friction developed may cause a local overheating to a temperature above the temperature of decomposition of the tetraethyllead. Faulty wiring, leaks onto steam pipes, and other accidental causes also may produce local overheating with resulting dangerous decomposition.

It is seen therefore that in those operations where an alkyllead compound is in the undiluted or concentrated state—viz. separation, purification, blending, transportation, and storage—the likelihood of excessive thermal decomposition must be provided for and effectively combatted.

An object of this invention is to stabilize alkyllead compounds against thermal decomposition during one or more of the following operations: separation, purification, blending, transportation, and storage.

The above and other objects of this invention are accomplished by incorporating with alkyllead compounds a relatively small quantity of a material which has the property of inhibiting alkyllead thermal decomposition. These objects are also accomplished by conducting one or more of the foregoing operations in the presence of such a material. The materials which have been found to possess the property are referred to hereinafter as "thermal stabilizers."

The thermal stabilizers of this invention are compounds having the formula

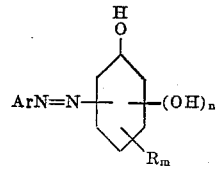

wherein Ar is an aryl hydrocarbon group containing from 6 to about 12 carbon atoms, and containing up to 1 substituent selected from the class consisting of halogen and nitro groups; R is an alkyl group containing from 1 to about 10 carbon atoms; and $n$ and $m$ are integers from 0 to 1. These thermal stabilizers when used in amounts varying from about 0.5 to about 10 percent by weight of the lead alkyl product are effective in substantially retarding or preventing thermal decomposition at temperatures above 100° C. for extended periods of time.

Another important feature of this invention is the fact that the foregoing thermal stabilizers are, in general, stable to heat, light, exposure to air, and other conditions to which alkyllead compounds may be subjected during their separation, purification, blending, transportation, and storage. Thus, for example, the thermal stabilizers of this invention have no tendency to react to form gums or other obnoxious reaction products in the alkyllead composition.

A further advantage in using these thermal stabilizers is that they are not corrosive to the surfaces of metals commonly used in the fabrication of alkyllead storage tanks, pipe lines, tank cars, storage drums, and the like.

An exceedingly important feature of this invention is the fact that the foregoing thermal stabilizers have an additional beneficial property of inhibiting concentrated alkyllead compounds against oxidative deterioration. Therefore, the above compounds serve a dual function. They protect the alkyllead compound against thermal decomposition at temperatures above 100° C. and they also protect the allyllead compound against oxidative deterioration which occurs when alkyllead concentrates come in contact with air or oxygen at ordinary temperatures.

Typical thermal stabilizers of this invention include benzene azo resorcinol, benzene azo isopropylphenol, toluene azo decylphenol, 4-bromo benzene azo phenol, 3-iodo benzene azo methylresorcinol, alpha-naphthalene azo phenol, beta-naphthalene azo resorcinol, nitro toluene azo phenol, chlorotoluene azo m-cresol, chlorocumene azo hydroquinone, 5-nitro-alpha-naphthalene azo catechol, 2-fluorobenzene azo tert-butylphenol, 4-ethyl-beta-naphthalene azo 2-(1,1,3,3-tetramethylbutyl)hydroquinone, chloroxylene azo tert-amylcatechol, and the like.

The principal thermal decomposition products of alkyllead compounds are metallic lead and hydrocarbon gas. Consequently, a very good index of alkyllead thermal decomposition is liberation of this gas.

To illustrate the effectiveness of this invention, direct comparisons were made between the decomposition characteristics of unstabilized and stabilized tetraethyllead. A thermostatically controlled hot oil bath was fitted with a stirrer, thermometer, and a holder for a small reaction tube. A 100 cc. gas buret beside the bath and equipped with a water-containing levelling bottle, was connected by means of rubber tubing with the reaction tube after the desired sample was introduced into this tube. After the bath was brought to a steady temperature of 160° C., the sample-containing tube was quickly immersed in the bath and clamped with the levelling bottle adjusted to hold the gas buret in place at a zero reading. Then measured was the time during which the sample was held at 160° C. without pronounced thermal decomposition and consequent gas evolution occurring. Thus, the longer the time, the more thermally stable was the alkyllead composition.

With pure tetraethyllead used in 1 ml. amounts, pronounced thermal deterioration occurred within 1 minute as evidenced by rapid gas evolution. In fact, the decomposition of unstabilized tetraethyllead will normally become uncontrollable if it is heated, whether rapidly or slowly, to even 130° C., unless it is possible to very rapidly cool it down to about 100° C., or below.

However, when to the same amount of tetraethyllead there was previously added 2 percent by weight of various thermal stabilizers of this invention, no pronounced thermal deterioration occurred for extended periods of time. Thus, complete protection was afforded by benzene azo resorcinol for 61 minutes, by 2-chloro benzene azo resorcinol for 46 minutes, by alpha-naphthalene azo phenol for 46 minutes, by beta-naphthalene azo phenol for 52 minutes, by alpha-naphthalene azo resorcinol for 55 minutes, by beta-naphthalene azo resorcinol for 73 minutes, by p-nitro benzene azo resorcinol for 78 minutes, and by m-nitro benzene azo resorcinol for 57 minutes.

An important facet of this invention is the discovery that the thermal stabilizers must possess the structure set forth above. In other words, in order to achieve the foregoing great effectiveness, the phenol must contain only 1 aryl azo group. Furthermore, the ring to which the phenolic group is attached must be a six-membered ring possessing benzene-type unsaturation as distinguished from a fused ring system as found in naphthalene. This six-membered ring can be substituted with an alkyl group containing up to 10 carbon atoms and it can contain one or two phenolic hydroxyl groups. The very great importance of these structural criteria is shown by the fact that superficially related compounds which do not possess these criteria exhibited only a small fraction of the effectiveness provided by the present thermal stabilizers. By way of illustration, 2 percent by weight of 4,6-bis-benzene azo resorcinol (a compound containing two aryl azo groups in the molecule) failed to protect the tetraethyllead against thermal deterioration at 160° C. beyond 10 minutes. Similarly, naphthalene azo naphthol (a compound in which the phenolic hydroxyl group is attached to a naphthalene nucleus rather than to a benzene nucleus) failed to protect the tetraethyllead under the same conditions for more than 7 minutes.

The above-described beneficial behavior of the thermal stabilizers of this invention also takes place with other alkyllead compounds such as triethyllead bromide and tetrapropyllead. In fact, these compounds when stabilized can be boiled and distilled at atmospheric pressure.

This invention is adapted to the stabilization of tetraethyllead and other alkyllead compounds at various stages after they have been formed and the diluents or excess alkyl halide have been discharged from the autoclave. For example, one of the above thermal stabilizers may be added in appropriate quantity to the alkyllead reaction concentrate just before the separation step which is conducted at a temperature close to the temperature where hazardous run-away decomposition is particularly prevalent. By adding one of the above thermal stabilizers to the reaction concentrate just prior to distillation, the danger arising from unexpected temperature increases is substantially eliminated.

Most preferably the above thermal stabilizers are employed to stabilize the alkyllead compound both in storage and in shipping and especially to stabilize any alkyllead concentrate, i.e., compositions containing at least 80 percent by weight of alkyllead compound. If elevated temperature conditions are likely to be encountered, the addition of a small amount of thermal stabilizer to the alkyllead compound will economically and satisfactorily eliminate most of the hazard involved. While meticulous temperature control and exacting safety measures have been successful in reducing to a minimum the hazards of processing and handling of tetraethyllead, the use of this invention provides a much greater factor of safety. Furthermore, waste of the alkyllead product due to decomposition is considerably minimized through the use of the this invention.

This invention is useful in stabilizing alkyllead compounds in which at least one valence of the lead is satisfield by an alkyl radical. For example tetraethyllead, tetramethyllead, tetrapropyllead, dimethyldiethyllead, triethylphenyllead, and triethyllead bromide can be successfully stabilized against thermal decomposition by incorporating therein a relatively small quantity of one of the thermal stabilizers of this invention.

What is claimed is:

1. A method of inhibiting the decomposition of an alkyllead compound at temperatures from about 100° C. to about 160° C. which comprises incorporating with said compound a small amount of a compound having the formula

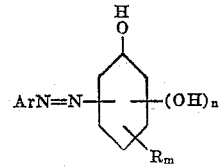

wherein Ar is an aryl hydrocarbon group containing from 6 to about 12 carbon atoms, and containing up to 1 substituent selected from the class consisting of halogen and nitro groups; R is an alkyl group containing from 1 to about 10 carbon atoms; and $n$ and $m$ are integers from 0 to 1 sufficient to inhibit such decomposition.

2. In the process of producing an alkyllead compound by reacting a sodium lead alloy with alkyl chloride and separating the thus produced lead alkyl compound from the reaction mass by steam distillation, the step which comprises conducting said steam distillation in the presence of a small amount of a compound as defined in claim 1 sufficient to inhibit thermal decomposition of the alkyllead compound.

3. An alkyllead compound containing, in amount sufficient to inhibit thermal deterioration thereof at temperatures from about 100° C. to about 160° C. a compound as defined in claim 1.

4. Tetraethyllead containing a small amount of a compound selected from the group consisting of benzene azo resorcinol; 2-chlorobenzene azo resorcinol, alpha-naphthalene azo phenol, beta-naphthalene azo phenol, alpha-naphthalene azo resorcinol, beta-naphthalene azo resorcinol, p-nitro benzene azo resorcinol, and m-nitro benzene azo resorcinol sufficient to inhibit thermal deterioration of the tetraethyllead at temperatures from about 100° C. to about 160° C.

References Cited in the file of this patent

UNITED STATES PATENTS

| | | |
|---|---|---|
| 2,660,591 | Calingaert | Nov. 24, 1953 |
| 2,727,053 | Krohn | Dec. 13, 1955 |